United States Patent Office 3,817,874
Patented June 18, 1974

3,817,874
PROCESS FOR INCREASING THE SURFACE AREA OF ACTIVE CARBONS
Arnold N. Wennerberg, Chicago, Ill., and John T. Bukvich, Whiting, Ind., assignors to Standard Oil Company, Chicago, Ill.
No Drawing. Continuation of application Ser. No. 760,693, Sept. 18, 1968, now Patent No. 3,642,657. This application Jan. 31, 1972, Ser. No. 222,381
The portion of the term of the patent subsequent to Feb. 15, 1989, has been disclaimed
Int. Cl. C01b *31/08, 31/10*
U.S. Cl. 252—445                2 Claims

ABSTRACT OF THE DISCLOSURE

Improved process for the production of active carbons by treating porous carbon with the oxide or hyroxide of an alkali metal or alkaline earth metal, and subjecting said treated carbon to a suitable acid anhydride and heat to form high surface carbons.

---

This is a continuation of co-pending U.S. Ser. No. 760,-693, filed Sept. 18, 1968, now U.S. Pat. 3,642,657.

BACKGROUND OF THE INVENTION

This invention relates to activated carbons, and more particularly to an improved process for the production of such carbons.

High surface activated carbons produced by the pyrolysis of a salt of a carboxylic acid are known, and have been previously disclosed in United States Patent Application Ser. No. 706,146, filed Feb. 16, 1968, now abandoned, by A. N. Wennerberg and R. M. Alm. The technique described in the Wennerberg-Alm application produces a high surface area carbon with a high degree of uniformity of pore size. In United States Patent Application Ser. No. 706,145, filed Feb. 16, 1968, now U.S. Pat. 3,624,004, by A. N. Wennerberg, there is disclosed a method of activating carbons having a high degree of uniformity of pore size at relatively low temperatures. Particularly suitable carbons are those produced by the process of Ser. No. 706,146.

The above processes produce activated carbons of low cost and high efficiency. However, in the above-identified applications it is necessary to make use of a great deal of solvent in order to effectively solubilize the carbon precursor in order to align the structure. Because of the large amounts of solvent necessary, evaporation is generally more costly than is desired. Along with the higher cost of evaporation there is associated a penalty in activation time. Furthermore, due to the relationship between solubility and pore structure, the electrolyte, which is taught in the above-identified applications as being a defecting agent, must be carefully chosen. In addition, when water is used as the solvent, the large amounts present enhance the possibility of by-product reaction during pyrolysis. This is true since water is an excellent oxidant.

SUMMARY OF THE INVENTION

We have now discovered a process for the production of activated carbons, which process has been found to overcome the disadvantages abovementioned. The active carbons of the present invention have been found to have considerably higher surface areas than is presently known, perhaps as high as the theoretical limit. Furthermore, such carbons may be produced at costs lower than the costs associated with the production of present carbons.

Briefly, the process of the present invention comprises treating a porous carbon with a suitable base and subsequently treating with an acid anhydride at a temperature sufficient to obtain a carbon of desired properties. The alkali metals and alkaline earth metals, in the form of the oxide or hydroxide, are suitable bases. The acid anhydride should be reactive with the base to form a reaction product which aids in expansion of the pores of the carbons and thereby increases the surface area. Dry hydrogen halides, CO, $CO_2$, etc. are satisfactory. Because of its cheapness CO is preferred. The choice of temperature is related to the time and quantity of exposure to the acid anhydride, e.g. $CO_2$, which in turn are all determinative of the rate of increase in surface area. It is thought that the impregnation with base provides an active site for $CO_2$ reaction which allows for selective expansion of the carbon pore size. The reaction has been found to enlarge pore size and increase surface area, although it would be expected that the $CO_2$ activation of the present invention would adversely affect surface area, especially since the pore structure is not as uniform as has previously been thought necessary. The porous carbon starting material may be any known active carbon, or any suitable carbonaceous material. The porous carbon starting material is activated carbon having a B.E.T. surface area between about 100 to 1300 m.$^2$/g. For example, an intermediate range porous carbon may be prepared by heat treating an aromatic acid to allow selective interaction and crosslinking to occur between individual acid molecules, thus leading to an intermediate polymer structure. This is carried out at a temperature high enough to allow for such crosslinking but sufficiently low to avoid significant decomposition of the acid. The cross-linked acid mass is then heated to decarboxylate the acid and thus form a carbon structure of intermediate range surface area. The heating procedure should be recognized as creating an aligned carbon having a relatively high surface area of essentially micropore structure. This alignment is accomplished without solubilizing the compound since it has unexpectedly been found that the above type of heat treatment provides a cross-linked structure through selective interaction. This carbon of intermediate range surface area may be used for specific applications or may be viewed as an intermediate compound which may be converted to a higher surface area carbon of larger pore range.

As may be readily observed from the above process steps, evaporation costs are held to a minimum since the impregnation of base may be accomplished with very high concentrations of base in water or other low heat capacity solvents for such base.

The process of the present invention is more specifically defined as follows (it should be understood that the following description makes reference to $CO_2$ as the acid anhydride but the invention is not to be construed as limited thereto): Aromatic carboxylic acid is heated at a temperature of from about 200° C. to 275° C. in an inert atmosphere, e.g. $N_2$ argon, etc. for a period of from less than 1 to 4 hours, preferably about 2 hours in order for the interaction and crosslinking of the structure to occur. Coke acid, for example, derived from the oxidation of petroleum coke is preferred as the aromatic carboxylic acid.

After the molecule has been sufficiently crosslinked the temperature is then rapidly raised to 350° C. to about 500° C., preferably about 450° C. in order to induce rapid decarboxylation of the aromatic acid. Decarboxylation may be accomplished in a relatively short period of time, for example 15 minutes to 45 minutes, preferably about 30 minutes. The above heating steps may be performed in a rotating kiln or similar holding vessel. The product obtained by the above heat treatment is a carbon of intermediate surface area.

The intermediate carbon may then be treated, for example, by impregnation with base. Any suitable solvent for the treating with the base may be used; for example, water, methanol, etc. Since it is desirable to avoid as much evaporation of the solvent as possible, the base should be highly concentrated. After the impregnation the solvent may then be removed by evaporation or any other means known to the art. Any suitable vessel for impregnation and evaporation may be used in this step.

Subsequent to the evaporation of the solvent the impregnated product is activated with $CO_2$, at a temperature of from about 600° C. to 800° C., preferably about 700° C. The carbon dioxide need not be of high purity. Carbon dioxides found as components of combustion gases are entirely satisfactory. The $CO_2$ flow rate should be equated with the proportion of carbon dioxide to the total gas mixture, if such mixture is used. Less than 0.5 to 2.0 s.c.f.m. is preferred, and most preferred is 1.0 s.c.f.m. per cubic foot of kiln volume. The $CO_2$ treatment is preferably performed in the range of from less than 15 minutes to more than 1½ hours, however the most preferred time is about ½ hour. These factors may be varied considerably due to the relationship of the conditions to each other and to the end product. Again the rotating kiln is a suitable vessel, however any vessel adapted to accomplish such $CO_2$ activation may be used.

The final step is the removal of by-products formed during the previous steps. This may be accomplished by washing, with for example, water, methanol, etc. Water is, of course, preferred here.

DESCRIPTION OF PREFERRED EMBODIMENTS

Example I

A charge of powdered, dry coke acid was charged to a rotating, externally heated Vycor kiln and maintained under an argon blanket. Several samples were prepared. The temperature of the first heating step, used to cross-link the structure, the holding time at such temperature, the temperature used to decarboxylate the acid and the holding time, and the B.E.T. surface area are given below:

| Example | First heating step Time (hrs.) | First heating step Temp., °C. | Second heating step Time (hrs.) | Second heating step Temp., °C. | Carbon surface area (B.E.T.) | Increase in B.E.T. surface area (percent) |
|---|---|---|---|---|---|---|
| Ia | ¼ | 250 | 1 | 550 | 100 | 22 |
| Ib | ½ | 250 | 1 | 550 | 230 | 175 |
| Ic | ½ | 250 | ½ | 450 | 300 | 204 |
| Id | 1 | 250 | ¼ | 450 | 630 | 278 |
| Ie | 2 | 250 | ½ | 450 | 700 | 265 |

Example II

The granular active carbon of Example Ie above, was impregnated with three times its weight of 85% KOH dissolved in methanol as a 20% solution. Twenty-five grams of active carbon was suspended in solution containing 75 grams of 85% KOH dissolved in 300 grams of methanol. Methanol was evaporated from the tumbled suspension using a Rinco evaporator with the suspension heated over the range 50° C. to 200° C. at 20 mm. Hg to effect removal of last traces of solvent. Portions of the dry impregnated carbon were charged to a rotating Vycor kiln and heated to the following specified temperatures at which time the sample was contacted with pure $CO_2$ for the specified time indicated below. $CO_2$ flow rate was 0.2 SCFM for a 400 ml. volume kiln.

| Example | Charge (g.) | Time (hrs.) | Temp., °C. | Active carbon surface area, B.E.T. |
|---|---|---|---|---|
| IIa | 17.6 | 2 | 600 | 851 |
| IIb | 17.6 | ½ | 650 | 1,928 |
| IIc | 17.6 | ½ | 700 | 2,125 |
| IId | 17.6 | ½ | 780 | 2,650 |
| IIe | 17.6 | ¼ | 780 | 2,557 |

All samples IIa through IIe were exhaustively washed with distilled water to remove all traces of basic by-product. The final wash with distilled water showed a pH of 6.5 equivalent to that of the distilled water used for washing.

Example III

A sample was prepared as in Example Ie followed by activation with $CO_2$ under conditions specified in Example II for 1½ hours at 780° C., yielded a carbon with a surface area (B.E.T.) in excess of 2600 m.²/g. and showed a methylene blue adsorption capacity equivalent to a surface area of 2000 m.²/g. The increase in B.E.T. surface area is 271%.

Example IV

A sample was prepared as in Example Ie by activation with $CO_2$ under conditions specified in Example II for ½ hour at 780° C., except 12 grams of impregnated carbon was charged to the kiln, and three weight units of an aqueous solution of the electrolytes listed below, for each weight unit of carbon, was used.

| Ex. | Sample | Surface area B.E.T. | Surface area Methylene blue | Increase in B.E.T. surface area (percent) |
|---|---|---|---|---|
| IVa | Carbon of Example Ie without activation. | 700 | 117 | 0 |
| IVb | Carbon of Example Ie with NaOH impregnation. | 1,880 | 1,945 | 168 |
| IVc | Carbon of Example Ie with KCl impregnation. | 450 | 109 | Decreases |
| IVd | Carbon of Example Ie with $Na_2CO_3$ impregnation. | 550 | 486 | Decreases |

Example V

The powdered commercial carbons listed below were activated in accordance with Example II except 12 grams of material was charged to the kiln and activated for ¼ hour at 780° C.

| Ex. | Commercial carbon | Prior to activation B.E.T. | Prior to activation Methylene blue | After activation B.E.T. | After activation Methylene blue |
|---|---|---|---|---|---|
| Va | Darco Activated Carbon grade KB (Atlas Chemical Industries, Inc.). | 1,284 | 708 | 1,684 | 1,730 |
| Vb | Aqua Nuchar A (West Virginia Pulp and Paper Co.). | 799 | 760 | 1,302 | 1,400 |
| Vc | Activated Carbon RB Pulverized (Pittsburgh Activated Carbon Co.). | 949 | 1,096 | 1,368 | 915 |

Example VI

A sample was prepared in accordance with the procedure of Example IId except it was not impregnated with KOH. The B.E.T. surface area was 484.

Examples I–III clearly show that the process of the present invention may be used to obtain active carbons of extremely high surface areas. Example V clearly shows that the process of the present invention has wide applicability to producing very high surface area carbons. Examples IV and VI are included to show that the presence of base is necessary to obtain such surface areas. Apparently, the carbon of Example VI has been degraded as a result of $CO_2$ treatment without impregnation.

What we claim is:

1. A process for increasing the surface area of activated carbon comprising the steps of:
   (a) mixing an activated carbon having B.E.T. surface area between about 100 to 1300 m.²/g. with a highly concentrated solution of solute selected from the group consisting of sodium hydroxide, and potassium hydroxide, said solute being present in amount sufficient to increase the surface area, as measured by the B.E.T. method, of said activated carbon between 31% and 278%, (b) heating the mixture of step (a) between 600° C. and 800° C. in the presence of gaseous carbon dioxide, (c) washing out essentially all of the inorganic material from the product of step (b).

2. The process of claim 1 wherein about three weights of said solute per weight of said activated carbon is used.

References Cited

UNITED STATES PATENTS

| | | | |
|---|---|---|---|
| 3,642,657 | 2/1972 | Wennerberg et al. | 252—425 |
| 1,849,503 | 3/1932 | Mommaerts | 252—445 |
| 1,502,592 | 7/1924 | Sauer | 252—421 |
| 3,492,244 | 1/1970 | Fujiwara et al. | 252—425 |
| 3,544,263 | 12/1970 | Ninomiya et al. | 252—447 |
| 3,624,004 | 11/1971 | Wennerberg | 252—425 |

FOREIGN PATENTS

| | | | |
|---|---|---|---|
| 292,039 | 6/1928 | Great Britain | 252—425 |
| 444,260 | 5/1927 | Germany | 252—425 |
| 630,886 | 10/1949 | Great Britain | 252—425 |
| 411,918 | 6/1934 | Great Britain | 252—445 |

DANIEL E. WYMAN, Primary Examiner

P. E. KONOPKA, Assistant Examiner

U.S. Cl. X.R.

252—425, 447; 423—460

UNITED STATES PATENT OFFICE
CERTIFICATE OF CORRECTION

Patent No. 3,817,874    Dated June 18, 1974

Inventor(s) Arnold N. Wennerberg and John T. Bukvich

It is certified that error appears in the above-identified patent and that said Letters Patent are hereby corrected as shown below:

Column 1, Line 24 - U.S. Patent 3,624,657 should be 3,624,004
Column 1, Line 33 - Omit "now abandoned"
Column 1, Line 38 - Omit "now U.S. Patent 3,624,004,"
Column 2, Line 9 - $CO$ should be $CO_2$
Column 2, Line 24 - $m^2$ should be $M^2$
Column 3, Line 40 - Omit column entitled "Increase in B.E.T. surface area (percent)" and add same to Table given in Example II in Column 3, Line 65.
Column 4, Line 8 - $m^2$ should be $M^2$
Column 4, Line 10 - $m^2$ should be $M^2$
Column 4, Line 40 - Add last column to table in Example V:

| Increase in B.E.T. Surface Area (percent) |
| --- |
| 31 |
| 63 |
| 44 |

Column 4, Line 69 - $m^2$ should be $M^2$

Signed and sealed this 1st day of October 1974.

(SEAL)
Attest:

McCOY M. GIBSON JR.
Attesting Officer

C. MARSHALL DANN
Commissioner of Patents

UNITED STATES PATENT OFFICE
CERTIFICATE OF CORRECTION

PATENT NO. : 3,817,874
DATED : June 18, 1974
INVENTOR(S) : Arnold N. Wennerberg and John T. Bukvich It is certified that error appears in the above-identified patent and that said Letters Patent are hereby corrected as shown below:

Column 2, Line 9  - $CO$ should be $CO_2$
Column 2, Line 24 - $m^2$ should be $M^2$
Column 3, Line 40 - Omit column entitled "Increase in B.E.T. surface area (percent)" and add same to Table given in Example II in Column 3, Line 65.
Column 4, Line 8  - $m^2$ should be $M^2$
Column 4, Line 10 - $m^2$ should be $M^2$
Column 4, Line 40 - Add last column to table in Example V:

| Increase in B.E.T. Surface Area (percent) |
| --- |
| 31 |
| 63 |
| 44 |

Column 4, Line 69 - $m^2$ should be $M^2$

This certificate supersedes Certificate of Correction issued October 1, 1974.

Signed and Sealed this sixth Day of January 1976

[SEAL]

Attest:

RUTH C. MASON
Attesting Officer

C. MARSHALL DANN
Commissioner of Patents and Trademarks